United States Patent [19]
Bussi et al.

[11] 3,858,100
[45] Dec. 31, 1974

[54] D.C. MOTOR SPEED CONTROL SYSTEM THROUGH PHASE CONTROL AND PHASE LOCKING CIRCUIT

[75] Inventors: Giorgio Bussi, Milano; Aldo Schiaparelli, Rho, both of Italy

[73] Assignee: Honeywell Information Systems Italia, Milan, Italy

[22] Filed: May 1, 1973

[21] Appl. No.: 356,240

[30] Foreign Application Priority Data
May 4, 1972 Italy.................................. 23885/72

[52] U.S. Cl. ............................................... 318/314
[51] Int. Cl. ............................................... H02p 5/16
[58] Field of Search ........................... 318/314, 318

[56] References Cited
UNITED STATES PATENTS
3,176,208  3/1965  Gifft............................ 318/318
3,582,550  6/1971  Latanzi........................ 318/318

Primary Examiner—David Smith, Jr.
Assistant Examiner—Thomas Langer
Attorney, Agent, or Firm—Fred Jacob

[57] ABSTRACT

A digital phase control adjustment system is provided for a d.c. motor which finds particular utility in applications where fast start and stop operations of the motor are required. The pulses forming a reference signal and those forming a variable signal are stored sequentially in a shift register and when the shift register is alternately storing ones and zeros, the pulses of the two signals are in alternate sequence for a certain number of periods, indicating that the motor speed is near the intended value.

7 Claims, 2 Drawing Figures

3,858,100

D.C. MOTOR SPEED CONTROL SYSTEM THROUGH PHASE CONTROL AND PHASE LOCKING CIRCUIT

BACKGROUND OF THE INVENTION

The present invention relates to motor speed control systems, and in particular to such system provided for a d.c. motor.

It is known that the system which is mostly used to control the speed of a motor is one for direct control of the speed: a tachometric dynamo or another similar device supplies the real speed signal which is compared to a reference signal: the error signal detected and suitably amplified gives to the motor a power supply voltage proportional to such an error and therefore has the tendency to increase, or reduce the speed, according to the error.

Such a control system as it is known, is defined as proportional and presents some drawbacks: above all, there is a difference between the real speed and that corresponding to the reference signal, and, more serious, such a difference results in being variable, for example as a function of the load. The result is that such a difference therefore cannot be corrected through simple and systematic means but it requires the introduction of so called integral action compensation, which modifies the reference signal both as a function of the error detected and as a function of the duration of the error itself.

A phase control adjustment system may be, in a certain sense included within the adjustment systems of this type as the error signal employed is not directly a speed error signal, but is a phase difference signal that is an integral function of the speed difference.

In general, it can be said that a phase control adjustment circuit includes a period reference signal generator and a periodic signal generator related to the speed to be controlled.

In addition it includes a phase comparing circuit to measure the phase difference between two signals and to supply a phase signal proportional to such a difference. Such a phase signal, suitably amplified, is used for the power supply to the motor.

It is evident that if for any reason the motor speed tends to vary, the phase difference between the two signals is modified and may cause a variation in the power supply conditions of the motor, bringing back the speed of the motor, itself, to the pre-fixed value.

A speed difference cannot, in fact, last indefinitely because it causes an ever wider variation in the phase difference (which is only limited by the adopted applied solutions) and an ever wider corresponding variation of the error signal, and therefore, of the corrective action.

For such phase control adjustment systems a critical element is, in general, the phase locking, as the adjustment is effective only for speed differences contained within certain limits. For example, when starting off, a motor has some difficulties in adjusting through a phase control adjustment system.

It is necessary in general to plan for some circuits or systems inhibiting the adjustment action applied by the phase control system during the start-off phase; circuits providing to start the motor, submitting it, if needed, to different adjustment conditions (for example checks on acceleration) and to insert the phase control adjustment system only when the real speed is sufficiently near to that required. Such circuit or systems are in general rather complex and costly. For phase control adjustment systems of the digital type, that is, those in which the periodic reference signal and the variable one are of binary type, a logic circuit, also digital and particularly simple has been developed to provide phase locking. Briefly, such a circuit inhibits the phase control condition and imposes particular acceleration conditions until when a binary counter, zeroed by every pulse of the periodic reference signal, accomplishes the subsequent count of two pulses of the variable periodic signal. Such a condition obviously occurs when the speed to be adjusted has exceeded the required value. In such a condition, the adjustment action occurs for the speed in excess of that speed desired.

SUMMARY OF THE INVENTION

The present invention instead refers to a digital phase control adjustment system, even more simple and efficient, in which the phase reference occurs for speed less than those desired, and therefore requires shorter reference times. The system is, therefore, particularly indicated for speed adjustments in which it is necessary to accomplish very fast start and stop operations of a motor, as in the case of magnetic tape transport systems in magnetic recording units of data processing systems.

Summarizing, the system is characterized in that the pulses forming the periodic reference signal and those forming the periodic variable signal are stored in sequence in a shift register giving to said pulses a suitable binary value 1 or 0. When the shift register is storing alternatively "ones" and "zeros" this means that the pulses of the periodic reference signal and those forming the periodic variable signals are in an alternate sequence for a certain number of periods and indicates, therefore, that the speed intended to be controlled is near the desired value.

BRIEF DESCRIPTION OF THE DRAWING

The characteristics and the advantages of the invention will be made clearer by the following description given only as a non-limiting example and by the attached drawing in which.

DESCRIPTION OF THE PREFERRED EMBODIMENT

Figure 1:
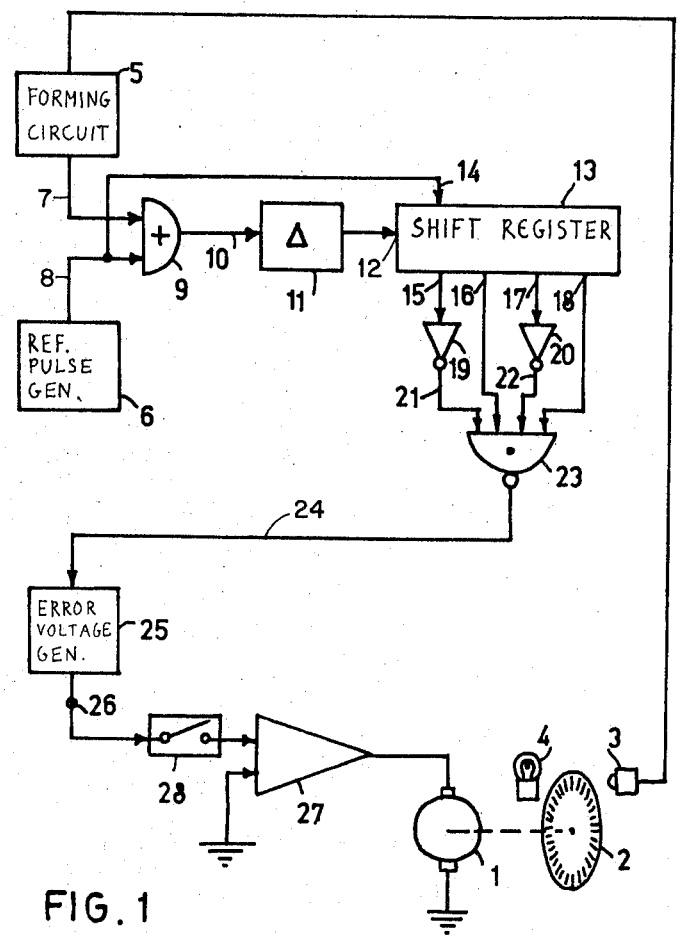
FIG. 1 represents schematically through a block diagram the control system and phase lock, which is an object of the invention.

FIG. 1 represents schematically through a block diagram the control system and phase lock which is the object of the invention.

Reference numeral 1 indicates a d.c. motor, on whose shaft a tachometric disc 2 is keyed. The disc presents on its surface a regular sequence of indexes, for example transparent windows, which are detected by a photoelectric detector 3 cooperating with a light source 4. When the disc 2, interposed between the source 4 and the detector 3, rotates, the detector issues a series of electric pulses which are amplified and shaped by a suitable forming circuit 5. The forming circuit 5 transforms the electric pulses issued by the detector 3 into rectangular pulses with a defined and constant width and also with a defined and constant length which is very short, for example on the order of some hundreds of nanoseconds. The frequency with which such pulses are repeated is proportional to the revolution speed of the motor 1.

In addition to the forming circuit 5 a reference pulse generator 6 is provided. Such a generator may consist of a crystal oscillator, one-shot circuit oscillator, or delay line oscillator. The important thing being that it supplies a sequence of electric pulses having a defined and constant width, a very short defined and constant length, for example on the order of some hundreds of nanoseconds, and with a defined frequency corresponding to the frequency of the pulses issued by the forming circuit 5 when the motor 1 rotates at the prefixed speed.

We will define as reference pulses and reference frequency the pulses and the respective frequency issued by the generator 6. We will define as tachometric pulses and tachometric frequency the pulses and the respective frequency issued by the forming circuit 5.

The tachometric and reference pulses, which will be assumed positive, are applied through the wires 7 and 8 to the inputs of an OR-circuit 9, whose output 10, suitably delayed through a delay 11, is connected to the timing or clock input of a shift register 13. The wire 8 is also connected to the serial data input 14 of the shift register and applies to it the reference pulses.

As is known, the operation of a shift register is the following:

Every time a timing pulse is applied to the timing input, the binary data bit which in that moment is present or applied to the serial data input is stored in the first cell of the shift register. At the same time, the binary data bit which was previously contained in the first cell is transformed and stored in the second cell, and the data bit contained in the $n$th cell is transformed and stored in the $n + 1$-th, except for the data bit contained in the last cell, which goes out. The status of each cell indicates on the corresponding output as a binary logic-electric level.

In FIG. 1 it is assumed that the shift register 13 consists of four cells: there are therefore four outputs 15, 16, 17, 18. In this case, the tachometric and reference pulses applied to the timing input 12 make the register evolve or move forward, while the signal present on input 14 is generally at a level one together with the reference pulses and at a level zero for the rest of the time, that is in particular together with the tachometric pulses, if these are not overlapping the reference pulses, it defines the binary value of the data bit to be loaded at every received timing pulse.

The delay line 11 is introduced in the circuit such that the reference pulses are applied to the data input with a certain advance with respect to the application of the pulses themselves to the timing input: this is required in general for a correct operation of the shift registers in which the data loading and their transfer is driven by the leading edge of a positive timing pulse. It is then necessary to have the data bit already present at the data input. In case of shift registers driven differently the related delays can be accordingly modified. In conclusion, for every tachometric pulse received at the timing input a logic zero is loaded into the shift register, while for every reference pulse received, a logic one is loaded. The contents of the shift register examined at every instant through a decoding logic network allows one to obtain the suitable signals for speed adjustment and phase reference. The following will explain how this occurs.

Let us assume that initially the shift register is in reset conditions imposed for example by the powering on of the system. The contents of register 13 is therefore: 0000. As soon as the reference pulse generator starts to work, the register contents is modified and in the period of four pulses it takes the following configurations:

1000

1100

1110

1111

Let us now assume that the motor 1 starts the work.

Until the motor speed is below that required, the tachometric pulse frequency will be below that of the reference pulses. Therefore, the shift register will be loaded with a variable configuration, with more ones than zeros.

But when the motor speed approaches that required and, in the example, it exceeds 75 percent of the required speed the configuration 0101 will be loaded at a certain instant. The identification of such a configuration through a decoding network allows one to make certain that the motor speed is very close to the desired speed and it is possible to start to adjust the speed with a phase control system. FIG. 1 only shows a decoding network recognizing such a configuration.

The outputs 15 and 17 of the shift register are applied to the inputs of two inverter circuits 19 and 20. The outputs 16 and 18, and the outputs 21 and 22 of the two inverters 19 and 20 are applied to the inputs of a four-input NAND logic element 23. The output 24 of such a logic element evidently goes to a logic level 0 only when there is a logic level 1 on all the inputs, that is only when there is the configuration 0101 in the shift register.

The output 24 of the NAND element 23 is used to drive a circuit 25 generating an error voltage. Hereafter, there will be the description of the embodiment of such a circuit; presently, it is sufficient to indicate that such a circuit supplies a positive voltage on output 26, for example +5V if the signal applied to line 24 is permanently at logic level 1, and a negative voltage for example −5V if the signal applied to line 24 is permanently at logic level 0.

For a signal applied on line 24 commuting between logic level 0 and 1 with a frequency equal to that of the reference pulses, the voltage supplied in the output by the circuit 25 varies between +5V and −5V depending on the ratio between the period of presence of the signal at logic level 1 and the switching period. Such a voltage present on line 26 is amplified by an amplifier 27 and applied to the motor 1 through a possible interrupting device 28.

The start up of the motor and the phase lock with the described adjustment system occur in the following way: to start up the motor the switch 28 is closed: as the motor is stopped the shift register contains a configuration other than 0101, and for example 1111.

The signal on the line 24 is therefore a logic level 1. The voltage supplied by the generator 25 is therefore +5V. Such a voltage amplified and applied to motor 1 starts it up and gives it a continuous acceleration.

Initially, the tachometric pulses will be stored in the shift register as sporadic zeros and the configuration 0101 will not be stored, therefore the output of the NAND element 23 will remain at logic level 1 and the motor will continue to accelerate.

When the motor speed is such that two tachometric pulses are stored in the shift register, alternating with two reference pulses, the stored configuration will be 0101, and therefore the output of the NAND circuit 23 will go to logic level 0, to then go back to logic level 1 upon the reception of the subsequent reference pulse which loads the shift register with the configuration 1010. This means that the speed of the motor is very close to the desired speed and that in the immediately subsequent interval of time the storing of the configuration 0101 alternated, with the configuration 1010, will still occur with a certain frequency.

Under such conditions, the output of the NAND circuit 23 switches periodically from level 1 to level 0 and the power supply voltage is reduced as a function of the so called "duty cycle" of the signal in output from the NAND circuit 24. If the motor tends to exceed the prescribed speed, the tachometric pulses tend to fall within the period of the reference pulses in advance, and the interval within which the line 24 is at logic level 0 increases in length with respect to the interval within which the wire 24 is at logic level 1. The power supply voltage tends to decrease, and the motor speed is reduced. If the motor instead tends to assume a speed below the required speed, the opposite effect occurs, and the power supply voltage increases bringing the motor back to the required speed.

All this occurs due to the phase variation between reference pulses and tachometric pulses. The phase adjustment system therefore starts to work automatically when the tachometric frequency and, therefore, the measured speed approaches that required.

Figure 2:
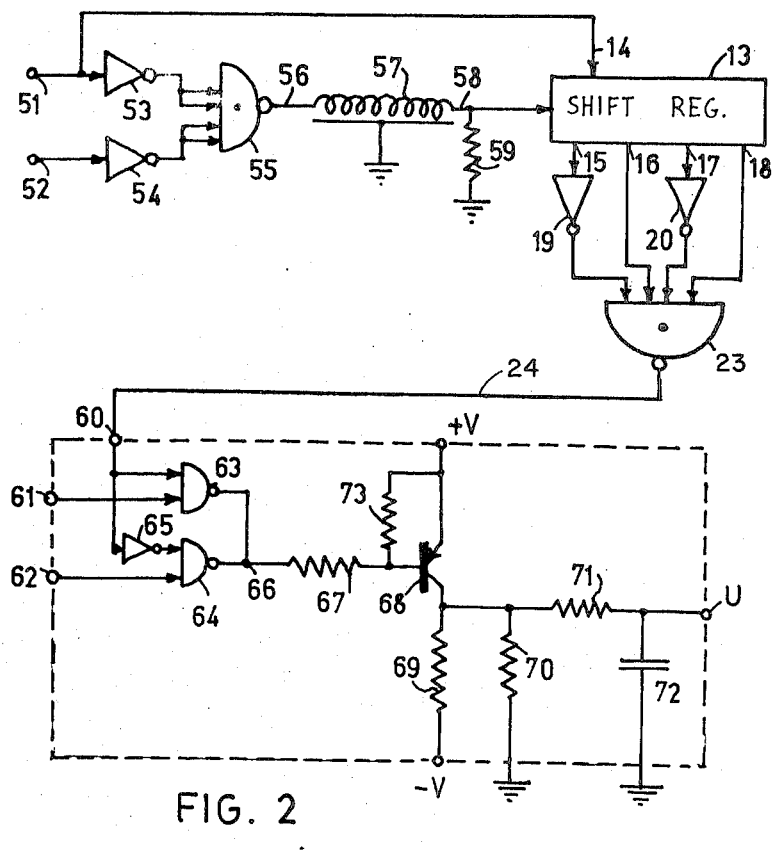
FIG. 2 represents a preferred form of embodiment of some portions of the control system of the invention.

FIG. 2 represents in detail a preferred form of embodiment, of the phase reference circuit already described in FIG. 1, and of the error voltage generating circuit already indicated with the numeral 25 in FIG. 1. The other parts of the adjustment circuit are not described as they already will be known by those skilled in the art.

In FIG. 2 the reference pulses and the tachometric pulses are applied to inputs 51 and 52 respectively of the phase reference circuit. Inputs 51 and 52 are connected respectively to the inputs of two NOT or inverter logic elements 53 and 54. Input 51 is also connected directly to the serial data input 14 of the shift register 13. The outputs of the two inverter circuits 53 and 54 are each connected to a pair of inputs of a four-input NAND logic element 55. The inverters 53, 54 and the NAND gate 55 accomplish within their complex the OR logic function carried out by the OR element 9 of FIG. 1. Their choice in replacement of the OR element 9 depends exclusively on the convenience to adopt logic circuits embodied with widely known circuit technology, as that known by the initials TTL (Transistor Transistor Logic). The output 56 of the NAND circuit 55 drives a delay element consisting of a delay line 57, closed at its end 58 on a resistor 59 having a value near the characteristic impedance of the line.

The output 58 of the line is directly connected to the timing input of the 4-bit shift register 13. Such a register is embodied preferably, as the other elements of the circuit, in integrated form and it is available on the market, supplied, for example, by Texas Instruments Corporation, under the code number 9300.

The four parallel outputs of the shift register 15, 16, 17 and 18 are connected, as has already been indicated, directly or through the interposition of the inverter elements 19 and 20 at the inputs of the NAND element 24. The output of the NAND element 23 is connected to the input 60 of the error voltage generator circuit 25. Such a circuit, in the preferred embodiment form, explained in FIG. 2, has two driving inputs 61 and 62 destined to receive two mutually exclusive signals, specifying the direction of the motor revolution conventionally defined as Forward (A) or Reverse (I). The A signal is applied to input 61, the I signal is applied to input 62, and the inputs of a NAND logic element 63 are connected to inputs 61 and 60. The input 60 is also connected to an inverter element 65. The input 62 and the output of the inverter 65 are connected to the inputs of a NAND logic element 64. The two NAND elements 63 and 64 are for example realized with TTL integrated circuits of the type known as "open collector."

The outputs of the two circuits, connected together and to point 66 accomplish the NAND logic function in the sense that in order to have a logic level 1 at point 66 both the outputs of the two circuits must be at logic level 1. The point 66 is connected through the resistor 67 to the base of the PNP transistor 68. The emitter of such transistor is connected to a suitable source of +V positive voltage, for example +5V. The transistor collector is connected, through a resistor 69 having a suitable value to a source −V negative voltage, for example −12V.

The collector is also connected to ground through a resistor 70 having a suitable value and to the integrating network RC consisting of the resistor 71 and the capacitor 72. The common point between the resistor 71 and the capacitor 72 is connected to an output terminal U. The circuit is completed by a resistor 73 to polarize the base of the transistor 68, connected between the +V voltage source and the base.

The operation of the circuit is the following.

When the command A of forward movement is present (and therefore the command I is absent) the NAND circuit is inhibited and it has no effect on the voltage present on point 66 from the electrical point of view, in fact, the output of the NAND circuit 63 results as being open, or not connected to ground.

The NAND circuit 63 instead is enabled, and its output results as open or closed to ground, depending on the logic level present on input 60. When such a logic level is 0, the output of the NAND circuit is open and therefore point 66 goes to the +V voltage level. When, instead, such a logic level is 1, the output of the NAND circuit 64 is closed towards ground, and therefore point 66 goes to ground potential. In standing off phase, the logic level present on input 60 is 1, therefore point 66 is at ground potential. Consequently, a current circulates through resistors 73 and 67 from the +V clamp towards point 66, which brings the base of transistor 68 to a voltage rather lower than +V and sufficient to polarize directly the function base emitter of transistor 68.

The transistor 68 therefore results in being on and its collector is therefore at a voltage practically equal to +V. Also the capacitor 72 is loaded through resistor 71 at the same voltage value which results in therefore being present also at the output terminal U. Such a voltage, suitably amplified, has the effect of accelerating the motor.

During control, the logic level present on input 60 switches periodically between 1 and 0, therefore point 66 passes periodically from the ground potential to the voltage level +V.

Simultaneously the transistor 68 goes on and off at the same rate. While, in the intervals in which the transistor 68 is on, the capacitor 72 tends to load to the voltage +V, when it is off, it tends to unload and then to load itself in the opposite sense, when a negative voltage imposed by the voltage divider consisting of two resistors 69 and 70. The average value of the voltage present on terminal U depends upon the ratio between the interval the transistor 68 is on and off. For such a ratio equal to 1, the voltage at terminal U is practically null, and results in being positive if the value of the ratio is greater than 1. In the opposite case such a voltage is negative.

The phase difference between the reference pulses and the tachometric pulses is transformed into a control voltage. Similarly, when there is the command I, the NAND circuit 63 is inhibited while the NAND circuit 64 is enabled. As in the start off phase the input 60 is at logic level 1, the output of the inverter 65 is at logic level 0. The result is that the output of the NAND element 64 is open and therefore point 66 is at voltage level +V. Consequently the transistor 68 is blocked or opened. Its collector is therefore at a negative voltage level defined by the breaker formed by resistors 69 and 70, and the capacitor 72 is loaded at the same voltage. Therefore, at the output U there will be a negative voltage of the motor acceleration.

During control, due to the periodic switching of the logic level at input 60, between 1 and 0 there will be instead, as already seen, an output voltage at terminal U which depends on the phase difference between the reference pulses and tachometric pulses.

The stopping of the motor, independently from the movement direction, will then be achieved by opening switch 28 indicated in FIG. 1 and then powering off the motor preferably setting suitable circuits for retroaction of the amplifier 27 such that the stopping occurs not due to frictions, but after a pre-fixed braking action.

FIGS. 1 and 2, describe therefore, through block diagrams and then in details, a preferred form of embodiment, of the invention.

It is believed evident that several are the changes which may be introduced without departing from the spirit of the invention, in particular adopting shift registers with more than four storage cells, or storing the timing and tachometric pulses as zeros and ones respectively rather than ones and zeros, or according to other criteria that may occur to those skilled in the art.

What is claimed is:

1. A system for controlling the speed of a d.c. motor through a phase control and phase locking circuit comprising:
   timing means to supply a sequence of timing pulses with a frequency representing the desired speed of the motor;
   means responsive to the motor speed for supplying a sequence of tachometric pulses, with a frequency representing the real speed of the motor;
   a binary unidirectional shift register with at least four storage cells to receive and store said timing pulses and said tachometric pulses in the order in which they are received;
   said timing pulses being stored as binary information of a first logic value;
   said tachometric pulses being stored as binary information of a second logic value;
   decoding means to decode the content of said shift register means and to supply a binary signal whose logic value is dependent on the contents of said shift register means; and
   means to convert said binary signal to a control voltage and to supply said motor with said control voltage.

2. A speed control system as set forth in claim 1 wherein said shift register means comprises four ordered memory cells;
   a first pair of output terminals, each one for one of two alternate cells;
   a second pair of output terminals, each one for one of the remaining two cells;
   and wherein said decoding means comprises two inverting logic elements connected to the first pair of terminals and a four input AND logic element having its inputs connected respectively to the output of said inverter elements and to said second pair of terminals.

3. A speed control system as set forth in claim 2 wherein said decoding means includes a third inverter logic element connected at the output of said AND logic element.

4. A system for controlling the speed of a d.c. motor through a phase control and a phase locking circuit comprising:
   timing means to supply a sequence of timing pulses with a frequency representing the desired speed of the motor;
   means responsive to the motor speed for supplying a sequence of tachometric pulses, with a frequency representing the real speed of the motor;
   a binary unidirectional shift register having a timing input a serial input and at least four storage cells and one output for each storage cell,
   said timing pulses and said tachometric pulses being applied to said timing input,
   said timing pulses being further applied to said serial input, whereby said timing pulses are stored in said shift register as binary information of a first logic value and said tachometric pulses are stored in said shift register as binary information of a second logic value;
   decoding means to decode the content of said shift register and to supply a binary signal whose logic value is dependent on the contents of said shift register,
   and means to convert said binary signal to a control voltage and to supply said motor with said control voltage.

5. A system for controlling the speed of a d.c. motor through a phase control and a phase locking circuit comprising:
   timing means to supply a sequence of timing pulses with a frequency representing the desired speed of the motor;

means responsive to the motor speed for supplying a sequence of tachometric pulses with a frequency representing the real speed of the motor, a binary unidirectional shift register having a timing input a serial input and at least four storage cells and one output for each storage cell, said timing pulses and said tachometric pulses being applied to said timing input, said timing pulses being further applied to said serial input, whereby said timing pulses are stored in said shift register as binary information of a first logic value and said tachometric pulses are stored in said shift register as binary information of a second logic value, decoding means to decode the content of said shift register and to supply a binary signal whose logic value is dependent on the contents of said shift register and means to convert said binary signal to a control voltage and to supply said motor with said control voltage.

6. A system for controlling the speed of a d.c. motor, comprising in combination:

reference means for producing periodic reference pulses of selected frequency;

tachometric means for producing periodic tachometric pulses of a frequency related to the speed of an associated d.c. motor;

serial shift register means having a data input, a clock input and a plurality of parallel outputs;

said reference pulses and said tachometric pulses being connected to said clock input of said shift register means for causing data shift in said register means in response to either one of said pulses, and said reference pulses being connected to said data input of the shift register means whereby data input of one logic level periodically is present at said data input at said selected frequency of the reference pulses whereas data input of the opposite logic level is present at said data input during reference interpulse periods so that data shifted into said shift registering means and the corresponding logic levels at said parallel outputs thereof depend upon the relative frequencies of said reference pulses and said tachometric pulses, and the frequency of said tachometric pulses when the d.c. motor is near a desired speed being related to said selected frequency such that a unique combination of said logic levels periodically is present at said parallel outputs; and decoding means connected to said parallel outputs of the shift register means and responsive to said periodic unique combination of logic levels for producing an output signal to control the associated d.c. motor to said desired speed.

7. A system as defined in claim 6 wherein the frequency of said tachometric pulses when the motor is at said desired speed is equal to said selected frequency of the reference pulses whereby said unique combination of logic levels is one of the two combinations represented by a sequence of zeros alternating with ones.

* * * * *